F. A. BROWNELL.
MOUNTING FOR PHOTOGRAPHIC SHUTTERS.
APPLICATION FILED MAR. 27, 1907.

900,081.

Patented Oct. 6, 1908.

Witnesses
Walter B. Payne
Russell B. Griffith

Inventor
Frank A. Brownell
By Church & Rich
his Attorneys

UNITED STATES PATENT OFFICE.

FRANK A. BROWNELL, OF ROCHESTER, NEW YORK, ASSIGNOR TO EASTMAN KODAK CO., OF ROCHESTER, NEW YORK, A CORPORATION OF NEW YORK.

MOUNTING FOR PHOTOGRAPHIC SHUTTERS.

No. 900,081.      Specification of Letters Patent.      Patented Oct. 6, 1908.

Original application filed August 3, 1904, Serial No. 219,287. Divided and this application filed March 27, 1907. Serial No. 364,832.

*To all whom it may concern:*

Be it known that I, FRANK A. BROWNELL, of Rochester, in the county of Monroe and State of New York, have invented certain new and useful Improvements in Mountings for Photographic Shutters; and I do hereby declare the following to be a full, clear, and exact description of the same, reference being had to the accompanying drawings, forming a part of the specification, and to the reference-numerals marked thereon.

The present invention has for its object to provide a mounting for photographic shutters which will facilitate their application to and removal from the usual carriage or support of the camera on which they are mounted and to this end it comprises generally a base plate mounted upon the carriage or support and interlocking studs or projections on one of the parts designed to coöperate with the other part in such a manner that the shutter casing will be detachably secured to the plate.

To these and other ends the invention consists in certain improvements and combinations of parts all as will be hereinafter more fully described, the novel features being pointed out in the claims at the end of the specification.

Figure 3:
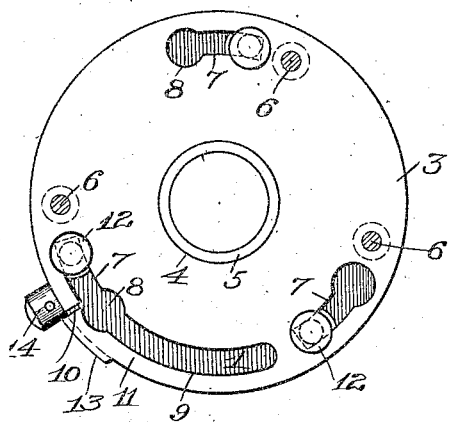
Figure 1:
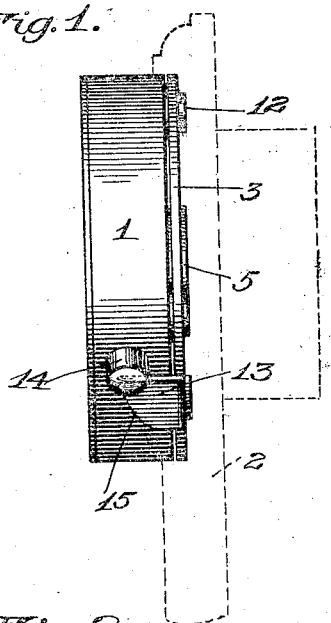
Figure 4:
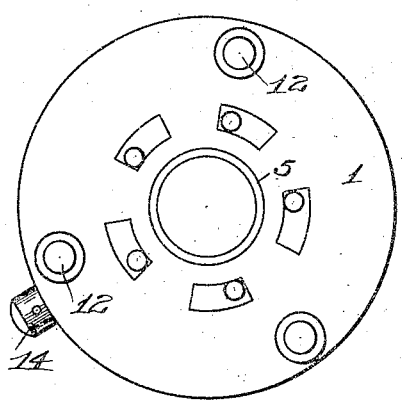
Figure 2:
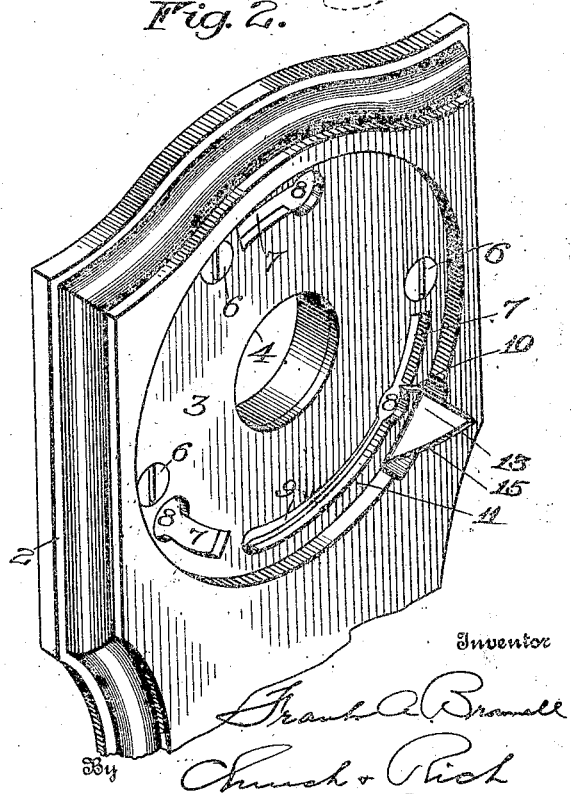

In the drawings: Figure 1 is a side elevation of a camera shutter and a base plate coöperating therewith, forming a mounting constructed in accordance with my invention. Fig. 2 is an enlarged perspective view showing the base plate applied to a camera front or lens carriage. Fig. 3 is a rear view of the parts shown in Fig. 1, and Fig. 4 is a similar view of the camera casing with the base plate removed.

Similar reference numerals in the several figures indicate similar parts.

In illustrating my present invention I have shown a type of camera shutter in conventional form indicated by 1, such as that shown in my prior application, Serial No. 219,287, filed August 3, 1904, of which this case is a division, together with the lens carriage or front board 2 of a camera, but it will be understood that these parts are merely employed for the purposes of illustration and may be of any desired form or construction.

The mounting comprises two interlocking members one of which is adapted to be attached to the lens carriage or camera front, the other embodying coöperating parts on the shutter casing. In illustrating the preferred embodiment of my invention I have shown one of these parts as a base plate 3, preferably circular in outline and provided with a central aperture 4, arranged in alinement with the aperture formed in the shutter by the opening and closing movement of the blades therein, said aperture being preferably made of a diameter to receive and form a journal bearing for the rearwardly projecting annular collar or rim 5, usually projecting from the rear side of shutter casings, to center the latter on the plate.

The plate 3 may be secured to the front or carriage 2 by suitable fastening devices, such as screws 6, and near its periphery it is provided with a plurality of concentric slots or apertures, 7 having enlarged ends 8. At one side of the plate one of the apertures is extended, as indicated at 9, and leading outwardly therefrom to the edge of the plate is a slot 10, forming a spring finger 11 which is capable of yielding in a direction transversely of the plate. On the rear wall or bottom of the shutter casing there are provided studs, corresponding in number and location to the slots 7, having heads 12 adapted to pass through said apertures 8 and to engage the rear side of the plate 3 when a relative rotary movement is given to the shutter casing and plate to carry the bodies of the studs into the apertures 7. In order to lock the aforementioned parts in engaged position the spring finger 11 is provided with a lip 13 which extends over the side of the shutter casing 1 and is adapted to engage with a projection 14 thereon. This projection may be a boss especially adapted for the purpose, or it may be a projecting portion of the shutter mechanism which has a relatively fixed position on the casing. The attachment of the casing and plate is facilitated by providing the lip 13 with a bevel surface 15 over which the projection 14 rides to depress it on the elastic finger 11 when these parts are rotated relatively to each other.

Devices constructed in accordance with my invention provide a simple and desirable means of attaching a shutter to the camera casing, as the plate 3 may be countersunk in a recess in the face of the latter, as shown in Fig. 2, permitting the shutter to be rigidly connected thereto without any visible means of support.

I claim as my invention:

1. A mounting for photographic shutters, comprising a shutter casing and a plate adapted to be rigidly secured to a camera, one of said parts being provided with a plurality of concentric slots and the other having a plurality of headed projections adapted to coöperate with said slots and to lock the plate and casing together when the latter is rotated on the former and a latch on one of the parts engaging the other to limit their relative rotary movement in one direction.

2. The combination with a support, an apertured plate thereon and a shutter casing, of studs on the casing adapted to extend through the apertures and having heads engaging in rear of the plate when the casing is revolved thereon in one direction, a latch on the plate and a shoulder on the casing adapted to engage therewith to prevent relative movement of parts in the other direction.

3. The combination with a support, a plate having a plurality of concentric apertures arranged therein and a shutter casing, of studs on the latter extending through the apertures and provided with heads adapted to engage the rear of the plate when the casing is revolved thereon and means on the plate projecting outwardly and coöperating with the shutter casing to hold it stationary on the plate.

4. The combination with a support, a plate having a plurality of concentric apertures arranged therein provided with enlarged ends and a shutter casing, of studs on the latter adapted to extend through the apertures and having heads engaging in rear of the plate, a spring finger carrying a projection and a shoulder on the casing coöperating therewith when the said casing and plate are rotated relatively.

5. The combination with a shutter casing having an aperture and leaves for closing it and headed studs on the rear of the casing, of a plate adapted to be attached to a lens support provided with a central aperture located in alinement with the shutter aperture and having concentrically arranged slots adapted to receive the studs, a spring finger on the plate and a projection on the casing engaging therewith.

6. The combination with a shutter casing having an aperture and leaves for closing it, an annular collar surrounding the aperture on the rear of the casing and headed studs arranged concentrically of said collar, of a plate adapted to be attached to a lens support provided with a central aperture for receiving said collar and having slots receiving the studs and means for preventing the relative rotary movement of the shutter casing and plate.

FRANK A. BROWNELL.

Witnesses:
WALTER B. PAYNE,
RUSSELL B. GRIFFITH.